(12) United States Patent
Stewart et al.

(10) Patent No.: US 9,256,304 B2
(45) Date of Patent: Feb. 9, 2016

(54) SYSTEMS AND METHODS FOR AUTOMATIC DISABLE OF INPUT DEVICES

(75) Inventors: Aaron Michael Stewart, Raleigh, NC (US); Masaki Matsubara, Sagamihara (JP); Hidetoshi Mori, Yamato (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 764 days.

(21) Appl. No.: 12/789,492

(22) Filed: May 28, 2010

(65) Prior Publication Data

US 2011/0291922 A1 Dec. 1, 2011

(51) Int. Cl.
*G09G 5/00* (2006.01)
*G06F 3/038* (2013.01)
*G06F 3/0354* (2013.01)
*G06F 3/041* (2006.01)

(52) U.S. Cl.
CPC ............ *G06F 3/038* (2013.01); *G06F 3/03547* (2013.01); *G06F 3/0416* (2013.01)

(58) Field of Classification Search
CPC .... G06F 3/03547; G06F 3/0416; G06F 3/038
USPC .......................................... 345/156, 173–178
See application file for complete search history.

(56) References Cited

U.S. PATENT DOCUMENTS

| | | | | |
|---|---|---|---|---|
| 5,996,080 A * | 11/1999 | Silva et al. | ..................... | 713/320 |
| 6,246,862 B1 * | 6/2001 | Grivas et al. | .................. | 455/566 |
| 6,266,050 B1 * | 7/2001 | Oh et al. | ........................ | 345/173 |
| 7,659,887 B2 * | 2/2010 | Larsen et al. | ................. | 345/170 |
| 8,004,498 B1 * | 8/2011 | Meridian | ...................... | 345/173 |
| 8,294,047 B2 * | 10/2012 | Westerman et al. | ....... | 178/18.03 |
| 2002/0158846 A1 * | 10/2002 | Clapper | ........................ | 345/168 |
| 2005/0079896 A1 * | 4/2005 | Kokko et al. | .................. | 455/566 |
| 2006/0066566 A1 * | 3/2006 | Law | ............... | 345/156 |
| 2006/0068851 A1 * | 3/2006 | Ashman, Jr. | .................. | 455/566 |
| 2009/0167717 A1 * | 7/2009 | Wang et al. | ..................... | 345/173 |
| 2009/0322683 A1 * | 12/2009 | Tsuji et al. | ..................... | 345/168 |
| 2011/0193809 A1 * | 8/2011 | Walley et al. | ................. | 345/173 |

* cited by examiner

*Primary Examiner* — Christopher E Leiby
(74) *Attorney, Agent, or Firm* — Ference & Associates LLC

(57) ABSTRACT

Systems, methods, apparatuses and computer program products configured to provide intelligent filtering techniques to reduce errant device inputs are described. For example, filtering out the data input from a touch pad while typing on the keyboard or operating with a pointing stick, even if the touch pad is sensing contact, is augmented by continuing to filter data from the touch pad until the contact on the touch pad ends.

19 Claims, 5 Drawing Sheets

SYSTEMS AND METHODS FOR AUTOMATIC DISABLE OF INPUT DEVICES

BACKGROUND

Some electronic devices (for example, a laptop, a tablet, or a notebook style personal computer (PC)) have multiple input devices available to the user. The most common input devices are keyboard and pointing devices (for example, a mouse and/or a touchpad). Recently, the pointing device landscape has become more complex. In certain systems there are now multiple input pads responsive to touch, for example, one for finger touch (touchpad) and one for stylus touch (digitizer). No matter the particular array of input devices provided, users encountering electronic devices with multiple inputs may inadvertently press or touch some input devices (for example, unintentionally provide input through the touchpad or the touchpad buttons). The result is inadvertent or errant input that sometimes causes errors (for example, cursor activity appearing on the screen that does not match the user's expectations or intentions).

BRIEF SUMMARY

In summary, one aspect provides an apparatus comprising: one or more input devices; and one or more processors; wherein, responsive to execution of computer readable program code accessible to the one or more processors, the one or more processors are configured to: ascertain inadvertent input via the one or more input devices; responsive to inadvertent input via the one or more input devices, disable one or more of the one or more input devices; and responsive to detecting removal of the inadvertent input via the one or more input devices, re-enable the one or more of the one or more input devices previously disabled.

Another aspect provides a computer program product comprising: a computer readable storage medium having computer readable program code embodied therewith, the computer readable program code comprising: computer readable program code configured to ascertain inadvertent input via the one or more input devices; computer readable program code configured to, responsive to inadvertent input via the one or more input devices, disable one or more of the one or more input devices; and computer readable program code configured to, responsive to detecting removal of the inadvertent input via the one or more input devices, re-enable the one or more of the one or more input devices previously disabled.

A further aspect provides a method comprising: ascertaining inadvertent input via one or more input devices of an electronic device; responsive to ascertaining inadvertent input via the one or more input devices, disabling one or more of the one or more input devices; and responsive to detecting removal of the inadvertent input via the one or more input devices, re-enabling the one or more of the one or more input devices previously disabled.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
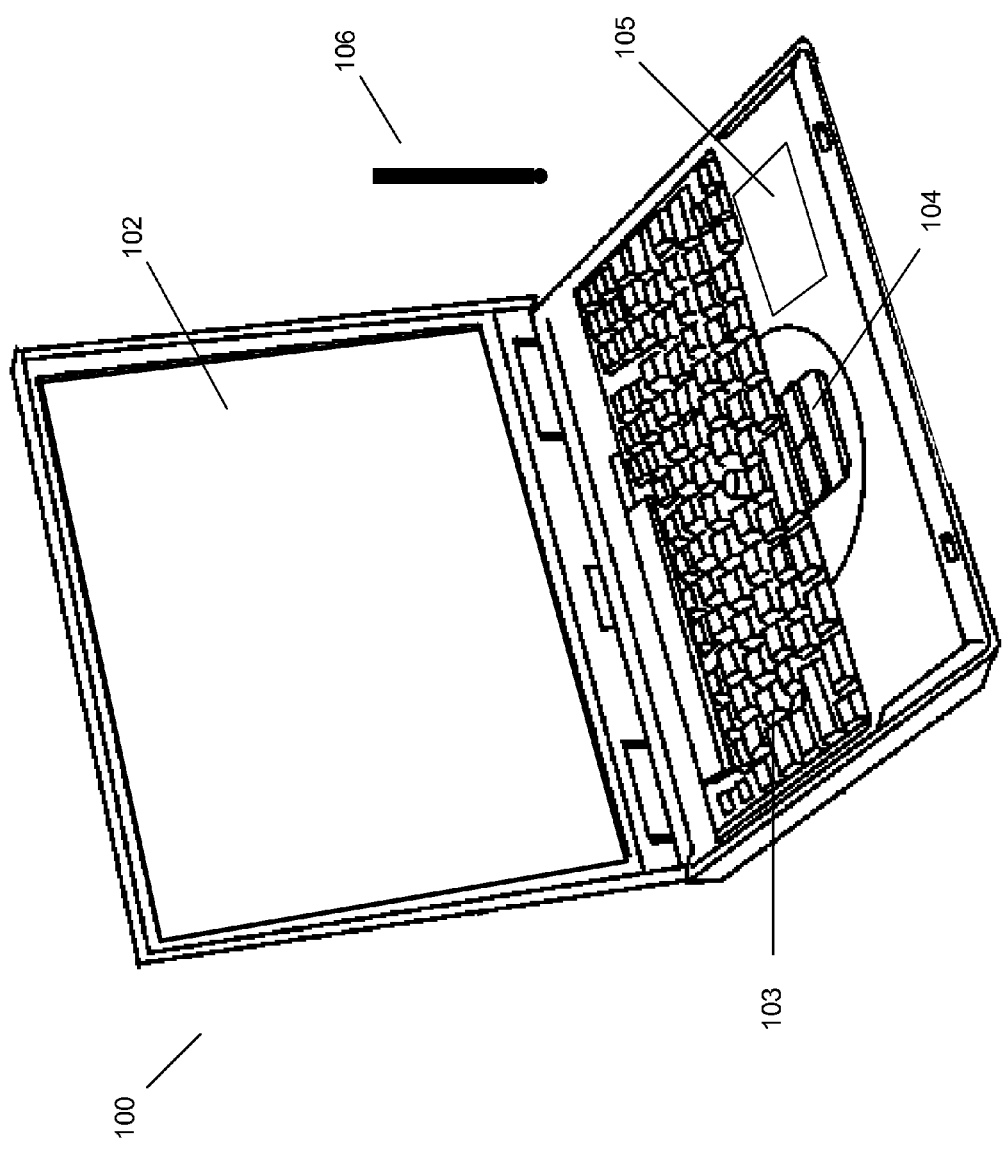
FIG. 1 illustrates an example electronic device with multiple input devices.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The inventors have recognized that conventional solutions to inadvertent input problems essentially fall into two categories. The first involves manually turning off one of the input devices (for example, pressing Fn.+F8 keys). This is often an impractical solution for the user, as many times the user wishes to quickly switch back and forth between the input devices to complete a task. The second solution involves using a "palmcheck" filter that filters out potentially inadvertent contacts based on the size of the contact. The palmcheck filter ignores (filters out) inputs that are deemed too large to be caused by finger contact (a palm contact has a much larger imprint area than a finger tip contact on a touchpad).

Moreover, the inventors have recognized that larger, flush touchpad devices increase the potential for inadvertent contact with the touchpad. This situation creates inadvertent pointer movement, area selection, and/or scrolling via the touchpad contact. Inadvertent contacts may include but are not limited to: hands touching sides of a touchpad area while typing; hands touching sides of a touchpad area while operating a pointing stick/stylus/pen; brushing the sides of a touchpad area when moving hands across clamshell-style cover of a notebook computer; and tapping of the top area of a touchpad while using the buttons associated to a pointing stick.

The inventors have recognized that palmcheck and other conventional filters, such as those configured to ignore touchpad input while keyboard or pointing stick input is detected (typing/stick filters), are inadequate to address the certain problematic use contexts. One reason is that these filters tend to involve a timing component such that the filter is only active for a predetermined time and, responsive to the predetermined time expiring, the input device (for example, a touchpad) is re-enabled.

Accordingly, the inventors have recognized a need for improved techniques for filtering inadvertent contact, such as input with a touch pad. This is particularly true for pointing stick users who use a dual-point system, but rarely use the touchpad intentionally. For instance, while reading or thinking, a user may hold his/her hand position longer than a specified idle time, which can cause a lapse in the effectiveness of the conventional filter(s).

Embodiments therefore provide systems, methods, apparatuses and computer program products configured to provide intelligent filtering techniques to reduce errant inputs. Example embodiments are described herein with specific reference to filtering out inadvertent/unintentional/errant touchpad inputs; however, those having ordinary skill in the art will recognize that filtering of other input device(s) can be implemented consistent with the example embodiments described herein.

Embodiments are configured to ignore the data from the touch pad (for example, tapping, cursor movement, gestures, and/or scroll) while typing the keyboard or operating with a pointing stick, even if the touch pad is sensing contact (for example, by palm or fingers). Embodiments further continue ignoring the data from the touchpad until the contact on the touchpad ends (for example, the data is ignored until the user lifts his/her palm or fingers from the touchpad, removing the touchpad input). Effectively, this intelligently erases any time component related to the filter(s). Certain embodiments optionally invoke a "starting zone" requirement (discussed further herein) to re-enable full touchpad support. Certain embodiments furthermore utilize stored information such that if repeated errant input is detected, for example a starting zone requirement is not being met, according to a predetermined threshold, the system is configured to assume these user is preferentially not utilizing the touchpad. Thus, the system is configured to implement a hard disable of the touchpad, leaving the touchpad disabled (for example until manual intervention reactivates the touchpad).

The illustrated example embodiments will be best understood by reference to the figures. The following description is intended only by way of example, and simply illustrates certain example embodiments.

Referring to FIG. 1, an example electronic device 100 having multiple input devices (103-106) is illustrated. The example electronic device 100 is a laptop PC; however, as will be readily apparent to one having ordinary skill in the art, the example embodiments discussed herein are equally applicable to a variety of other electronic devices, such as notebook computers, tablet computers, smart phones, and the like.

The laptop PC 100 illustrated in FIG. 1 includes a display screen 102 and a keyboard 103. Moreover, included is a touchpad device (and associated buttons) 104 as well as a digitizer 105 that can be used in conjunction with a stylus/pen 106. The user can provide inputs to the laptop PC 100 through any of these input devices.

As an example use case illustrative of certain embodiments, consider a scenario where a user is browsing the Internet and happens upon a web page of particular interest and pauses for some significant amount of time (for example, five or ten minutes) to read the contents of the web page. The user may choose to scroll down the web page to view the remaining contents, for example by using a down arrow key of the keyboard 103. While reading and/or scrolling, the user may inadvertently rest his or her palm or finger(s) on the touchpad 104, providing an inadvertent touchpad input.

As discussed herein, such inadvertent touchpad input may be filtered out using a palmcheck style filter; however, such filters have a timing mechanism whereby the filter is turned off after a predetermined time. In the use scenario described, the user may continue to inadvertently provide input via the touchpad while continuing to read the contents of the web page. In such a case, conventional filters will fail to adequately filter continued inadvertent touchpad input.

Figure 2:
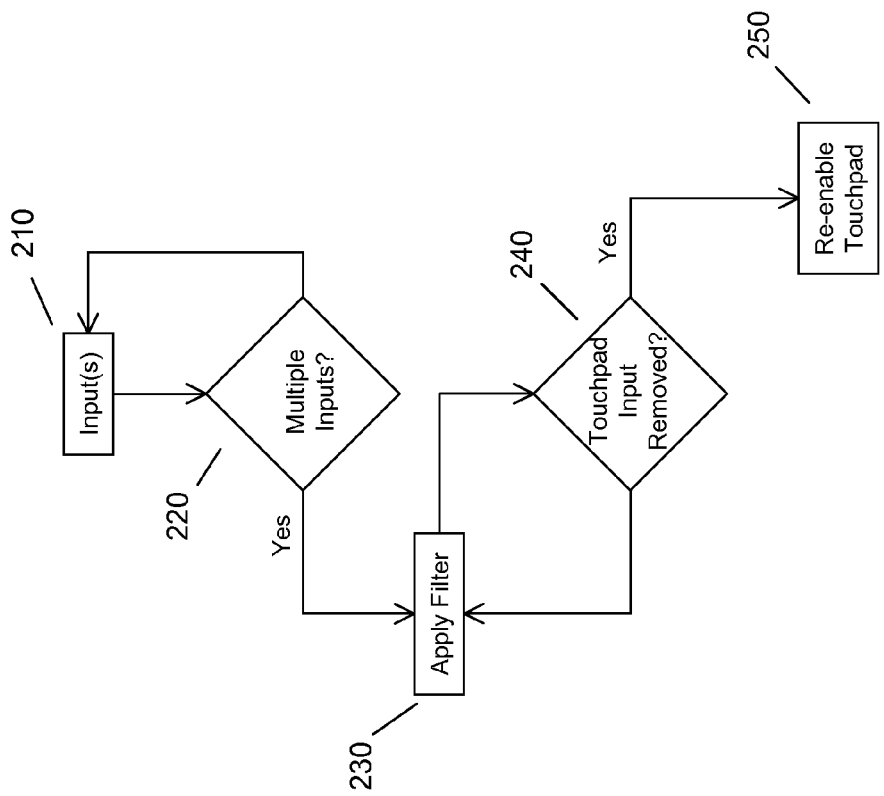
FIG. 2 illustrates an example input filtering method.

Referring to FIG. 2, an example method for filtering continued, inadvertent touchpad inputs is illustrated. The system detects inputs 210 from one or more of the input devices. A first determination 220 is made to ascertain if errant input is being provided, such as by detecting multiple input devices are being used. If yes, embodiments are configured to filter 230 one or more of the input devices, as for example input detected from multiple input devices is indicative of inadvertent input. Otherwise, input is not deemed inadvertent and there is no need to provide a filter.

While any of a variety of methods can be utilized to detect inadvertent input (for example, detecting palm input, detecting input outside of a predetermined "start zone", and the like), the described detection of multiple input devices being utilized is illustrative. A simple prioritization scheme can be used in such a case. Thus, while any of a variety of detection schemes and/or input filters can be applied, certain embodiments apply a prioritization filter, wherein certain input devices (for example, the keyboard 103) are prioritized over others (for example, the touchpad 104). Thus, in the scenario where keyboard input and touchpad input are detected at the same (or nearly the same) time, the keyboard input is utilized and the touchpad input is filtered out according to the priority scheme employed.

Referring again to the example use case of the user pausing to read the contents of a web page while scrolling with an arrow key of the keyboard 103, a continued touch pad input may cause difficulties for conventional filtering programs. As such, embodiments are configured to additionally detect the removal of touchpad input 240, such as by a user removing his or her hand/fingers/palm from the touchpad such that the touchpad input ceases. If the touchpad input is removed, the touchpad is re-enabled 250. Otherwise, embodiments are configured to maintain the filter to combat continued, inadvertent touchpad input.

Figure 3:
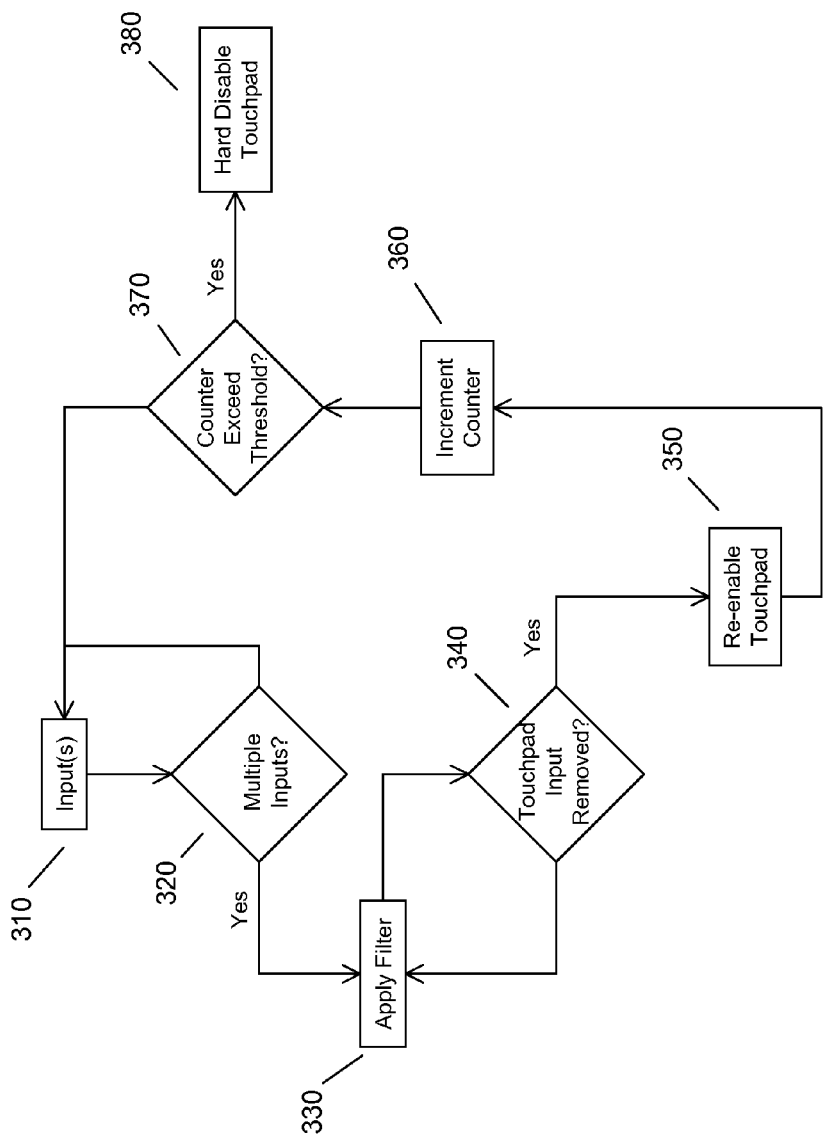
FIG. 3 illustrates an example input filtering method.

Referring to FIG. 3, an example method of employing a hard disable of the touchpad is illustrated. A hard disable is defined as a semi-permanent disablement of the touchpad such that a manual intervention (for example, opening an application and changing a setting to re-enable or requiring a combined key press to re-enable) is required to re-enable the touchpad. This may be referred to herein as a "permanent" disablement of the touchpad; however, those having ordinary skill in the art will understand that this means semi-permanent, as discussed herein.

Similar to the flow illustrated in FIG. 2, the system detects inputs 310 from one or more of the input devices. A first determination 320 is made to ascertain if multiple input devices are being used. If yes, embodiments are configured to filter 330 one or more of the input devices, as input detected from multiple input devices is indicative of inadvertent input. Otherwise, input is not deemed inadvertent and there is no need to provide a filter. Again, any of a variety of detection schemes/filters can be applied.

Referring again to the example use case of the user pausing to read the contents of a web page while scrolling with an arrow key of the keyboard 103, a continued touch pad input may cause difficulties for conventional filtering programs. As such, embodiments are configured to detect the removal of touchpad input 340, such as by a user removing his or her hand from the touchpad and touchpad input ceasing. If the touchpad input is removed, the touchpad is re-enabled 350. Otherwise, embodiments are configured to maintain the filter to combat continued, inadvertent touchpad input. Subsequent to re-enabling the touchpad 350, however, certain embodiments are configured to increment a counter 360 to track pattern(s) of usage of the input devices. If it is determined that the counter exceeds a threshold value 370, a hard disable of the touchpad can be implemented 380. Otherwise, the system can continue to filter inputs as previously described herein.

The hard disable can be useful in a variety of contexts. For example, it may frequently occur that the user does not intentionally provide touchpad input but frequently provides inadvertent touchpad input. In such a scenario, the counter can be employed to disable the touchpad such that the filtering mechanism has proactively disabled the touchpad in such a way that if the user should want to use the touchpad, a manual intervention is required to re-enable the touchpad. The counter can be configured as desired and/or set to a multitude of default settings. For example, the counter can simply count up to a predetermined threshold, count to a predetermined threshold within a predetermined time period (for example, several minutes), or count to a predetermined threshold within a certain use context (for example, beginning at start up or log in). Thus, the counter simply needs to perform a tracking function useful for determining repeated inadvertent inputs such that a hard disable is desirably implemented.

Figure 4:
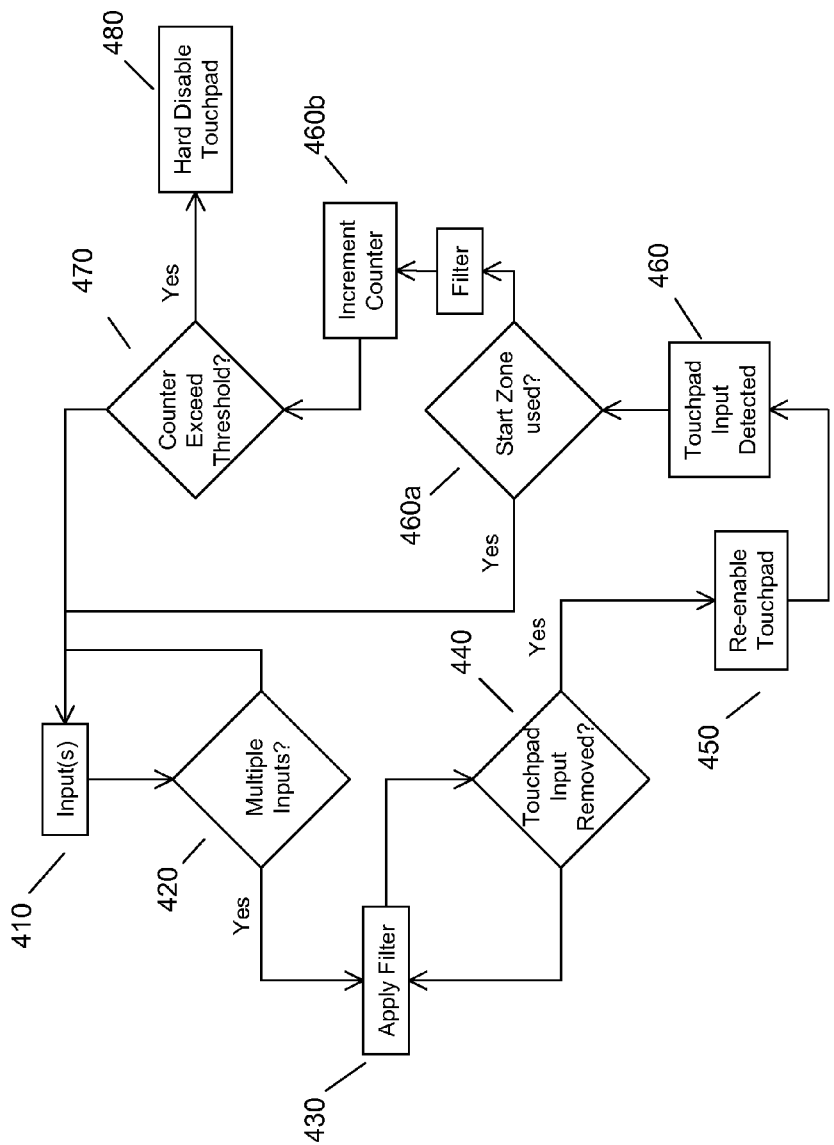
FIG. 4 illustrates an example input filtering method.

Referring to FIG. 4, similar to the flows illustrated in FIGS. 2-3, the system detects inputs 410 from one or more of the input devices. A first determination 420 is made to ascertain if multiple input devices are being used. If yes, embodiments are configured to filter 430 one or more of the input devices, as input detected from multiple input devices is indicative of inadvertent input. Otherwise, input is not deemed inadvertent and there is no need to provide a filter. Again, any of a variety of detection schemes/filters can be applied.

Referring again to the example use case of the user pausing to read the contents of a web page while scrolling with an arrow key of the keyboard 103, a continued touch pad input may cause difficulties for conventional filtering programs. As such, embodiments are configured to detect the removal of touchpad input 440, such as by a user removing his or her hand from the touchpad and touchpad input ceasing. If the touchpad input is removed, the touchpad is re-enabled 450.

In certain embodiments, if a touch pad input is detected 460, it is determined if a start zone is used 460a. In FIG. 4 this is illustrated subsequent to re-enabling the touchpad; however, this is by no means a requirement. A start zone is an area of the touchpad (for example, a central area) considered indicative of intended touchpad input. If the start zone has not been used, embodiments are configured to increment a counter 460b to track pattern of usage of the input devices. In this case, the tracking counter indicates touchpad input detected but failure to properly use the start zone. This is indicative of unintended touchpad input, which triggers filtering of that input.

Repeated incidents of unintended touchpad input is indicative of a user that may not wish to have the touchpad enabled. Thus, if it is determined that the counter exceeds a threshold value 470, a hard disable of the touchpad can be implemented 480. Otherwise, the system can continue to filter inputs as described herein.

To briefly recap, embodiments are configured to automatically filter inadvertent inputs to an electronic device. Certain embodiments provide filtering of inadvertent inputs from an input device determined to be providing inadvertent inputs until such inadvertent input has ceased. Moreover, certain embodiments provide intelligent filtering, such that repetitive inadvertent inputs are taken as a clue to provide a more permanent (or semi-permanent) filtering, such as disabling a touchpad entirely (until the user provides some manual intervention to re-enable the touchpad).

It will be understood by those having ordinary skill in the art that the embodiments can be implemented with electronic devices having appropriately configured circuitry, such as a desktop or laptop computer system, notebook and tablet computer systems, smart phones, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 5:
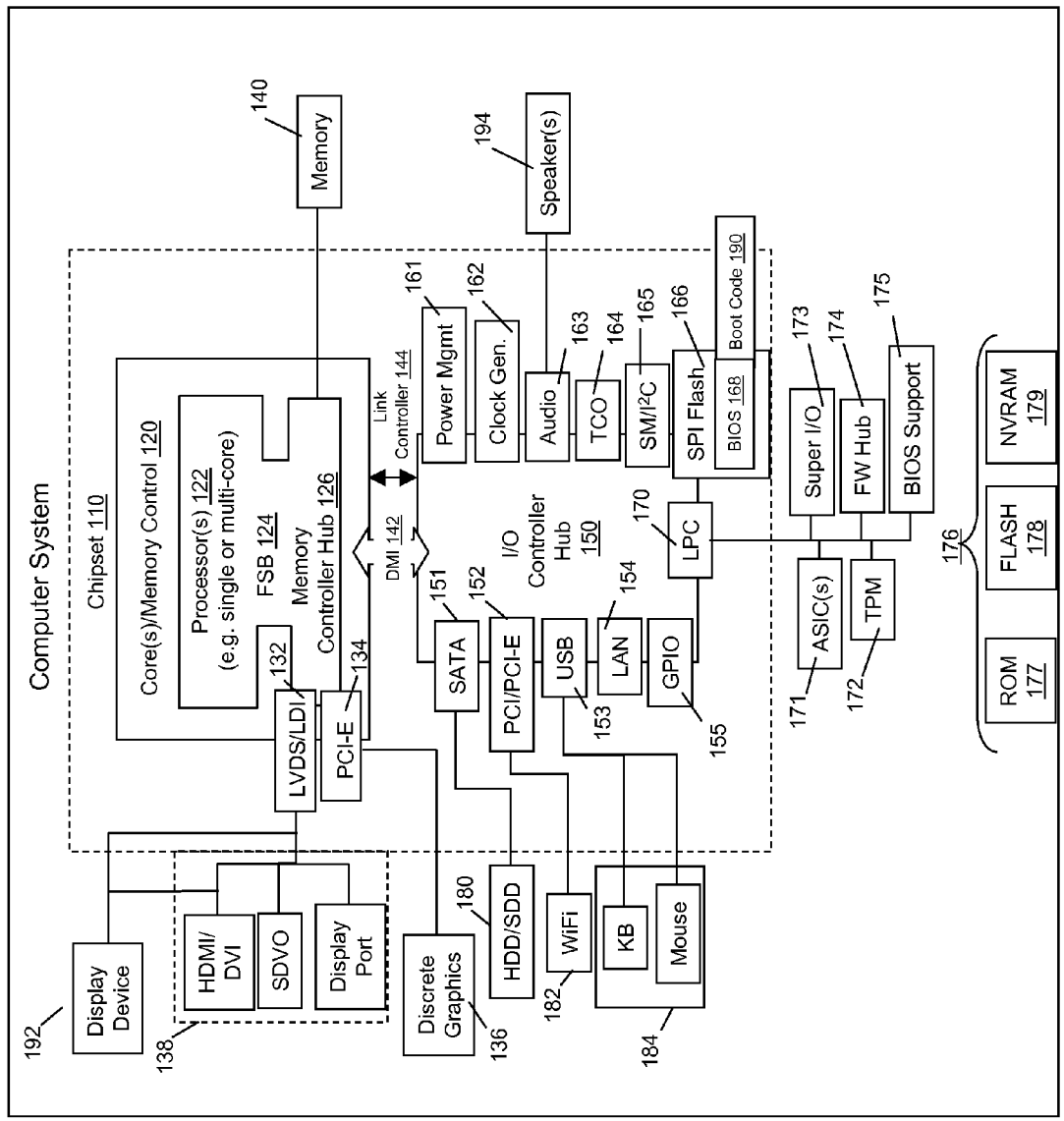
FIG. 5 illustrates an example computer system.

While various other circuits or circuitry may be utilized, FIG. 5 depicts a block diagram of one example of a computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 5.

The computer system of FIG. 5 includes a so-called chipset 110 (a group of integrated circuits, or chips, that work together, chipsets) with an architecture that may vary depending on manufacturer (for example, INTEL®, AMD®, etc.). The architecture of the chipset 110 includes a core and memory control group 120 and an I/O controller hub 150 that exchange information (for example, data, signals, commands, et cetera) via a direct management interface (DMI) 142 or a link controller 144. In FIG. 5, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 5, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 5, the I/O hub controller 150 includes a SATA interface 151 (for example, for HDDs, SDDs, et cetera), a PCI-E interface 152 (for example, for wireless connections 182), a USB interface 153 (for example, for input devices 184 such as keyboard, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 5.

Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. An apparatus comprising:
    two or more input devices of a laptop, the two or more input devices including a touch pad and an input device located proximate to the touch pad; and
    one or more processors;
    wherein, responsive to execution of computer readable program code accessible to the one or more processors, the one or more processors:
    ascertain multiple inputs from the two or more input devices;
    ascertain inadvertent input via one of the two or more input devices, including sensing input via the touchpad while sensing input from the input device located proximate to the touch pad, wherein sensing input via the touchpad is other than sensing inadvertent input with a palm check filter;

responsive to ascertaining inadvertent input via the one of the two or more input devices, disable one or more of the two or more input devices, wherein all input via the touch pad is filtered out according to a prioritization scheme that prioritizes non-touchpad over touch pad input, wherein said non-touchpad input is treated as prioritized input; and responsive to detecting removal of the inadvertent input via the one of the two or more input devices, automatically re-enable the input device previously disabled.

2. The apparatus according to claim 1, wherein to ascertain inadvertent input comprises ascertaining inadvertent input via the touchpad when ascertaining multiple inputs.

3. The apparatus according to claim 1, wherein the one or more processors determine if a start zone has been used.

4. The apparatus according to claim 3, wherein responsive to determining the start zone has not been used, implementing a hard disable of the touchpad.

5. The apparatus according to claim 1, wherein the one or more processors increment a counter responsive to ascertaining the inadvertent input.

6. The apparatus according to claim 5, wherein the one or more processors implement a hard disable if the counter exceeds a predetermined threshold.

7. The apparatus of claim 1, wherein input via the touch pad includes one or more of a palm input, a finger input, and a stylus input.

8. The apparatus of claim 1, wherein the inadvertent input is any of a stylus input and a finger input.

9. A computer program product comprising:
a computer readable storage device having computer readable program code embodied therewith, the computer readable program code being executable by a processor and comprising:

computer readable program code that ascertains multiple inputs from two or more input devices of a laptop, the two or more input devices including a touch pad and an input device located proximate to the touch pad;

computer readable program code that ascertains inadvertent input via one of the two or more input devices, including sensing input via the touchpad while sensing input from the input device located proximate to the touch pad, wherein sensing input via the touchpad is other than sensing inadvertent input with a palm check filter;

computer readable program code that, responsive to ascertaining inadvertent input via the one of the two or more input devices, disables one or more of the two or more input devices, wherein all input via the touch pad is filtered out according to a prioritization scheme that prioritizes non-touchpad over touch pad input, wherein said non-touchpad input is treated as prioritized input; and computer readable program code that, responsive to detecting removal of the inadvertent input via the one of the two or more input devices, automatically re-enables the input device previously disabled.

10. The computer program product according to claim 9, wherein the two or more input devices include at least a keyboard located on a surface and being situated proximate to a location of the surface containing the touchpad.

11. The computer program product according to claim 10, wherein the one of the two or more input devices providing inadvertent input is the touchpad.

12. The computer program product according to claim 9, wherein the inadvertent input is touchpad input.

13. The computer program product according to claim 9, wherein the computer readable program code further comprises computer readable program code that determines if a start zone has been used.

14. The computer program product according to claim 13, wherein the computer readable program code further comprises computer readable program code that, responsive to determining the start zone has not been used, implements a hard disable of a touchpad.

15. The computer program product according to claim 9, wherein the computer readable program code further comprises computer readable program code that increments a counter responsive to ascertaining the inadvertent input.

16. The computer program product according to claim 15, wherein the computer readable program code further comprises computer readable program code that implements a hard disable if the counter exceeds a predetermined threshold.

17. A method comprising:
ascertaining multiple inputs from two or more input devices of a laptop, the two or more input devices including a touch pad and an input device located proximate to the touch pad;

ascertaining inadvertent input via one of the two or more input devices, including sensing input via the touchpad while sensing input from the input device located proximate to the touch pad, wherein sensing input via the touchpad is other than sensing inadvertent input with a palm check filter;

responsive to ascertaining inadvertent input via the one of the two or more input devices, disabling one or more of the two or more input devices, wherein all input via the touch pad is filtered out according to a prioritization scheme that prioritizes non-touchpad over touch pad input, wherein said non-touchpad input is treated as prioritized input; and responsive to detecting removal of the inadvertent input via the one of the two or more input devices, automatically re-enabling the input device previously disabled.

18. The method according to claim 17, wherein the two or more input devices include at least a keyboard located on a surface and being situated proximate to a location of the surface containing the touchpad.

19. The method according to claim 18, wherein the one of the two or more input devices providing inadvertent input is the touchpad.

* * * * *